(12) United States Patent
Okabe

(10) Patent No.: US 9,046,696 B2
(45) Date of Patent: Jun. 2, 2015

(54) IMAGE PROCESSING APPARATUS

(71) Applicant: OLYMPUS CORPORATION, Tokyo (JP)

(72) Inventor: Masashi Okabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 373 days.

(21) Appl. No.: 13/693,616

(22) Filed: Dec. 4, 2012

(65) Prior Publication Data

US 2013/0155219 A1     Jun. 20, 2013

(30) Foreign Application Priority Data

Dec. 7, 2011    (JP) ................................ 2011-268103

(51) Int. Cl.
   *H04N 5/77*        (2006.01)
   *G02B 21/36*      (2006.01)
   *G06T 5/00*        (2006.01)
   *G06T 5/50*        (2006.01)

(52) U.S. Cl.
CPC .............. *G02B 21/365* (2013.01); *G06T 5/008* (2013.01); *G06T 5/50* (2013.01); *G06T 2207/10056* (2013.01); *G06T 2207/10144* (2013.01)

(58) Field of Classification Search
USPC ................. 386/224, 227, 226, 230, 248, 200; 348/79
See application file for complete search history.

(56) References Cited

U.S. PATENT DOCUMENTS 5,079,638 A *   1/1992   Kishi et al. ..................... 358/448
6,433,782 B1 *   8/2002   Nakatsuka et al. ............ 345/426

FOREIGN PATENT DOCUMENTS

JP      Hei 9-186917      7/1997

\* cited by examiner

*Primary Examiner* — Robert Chevalier
(74) *Attorney, Agent, or Firm* — Scully, Scott, Murphy & Presser, P.C.

(57) ABSTRACT

Optimal shading correction is achieved even when exposure times are different. An apparatus includes a section that stores a γ property of an image pickup device, a section that stores a shading pattern acquired by the image pickup device, and a first exposure time, a section that stores image data acquired by the image pickup device and a second exposure time, a section that calculates a pre-correction pattern, based on the stored shading pattern and the stored γ property, a section that calculates a revised pattern by performing γ correction for the calculated pre-correction pattern after multiplying the calculated pre-correction pattern by a ratio of the second exposure time to the first exposure time, and a section that performs shading correction for the stored image data by using the calculated revised pattern.

8 Claims, 9 Drawing Sheets

BACKGROUND OF THE INVENTION

1. Field of the Invention

The present invention relates to an image processing apparatus.

2. Description of Related Art

Conventionally, a microscope apparatus has been known, which acquires a shading pattern before photographing the image of a specimen, and corrects the image of the specimen acquired by photographing by the acquired shading pattern (See Patent Literature 1, for example.).

Patent Literature 1 Japanese Unexamined Patent Application, Publication No. Hei 9-186917

However, at the time of photographing a specimen by the microscope apparatus of Patent Literature 1, a different exposure time is adopted in accordance with the specimen and the state of illumination, and when the exposure time at the time of photographing the specimen significantly differs from the exposure time at the time of acquiring a shading pattern, sufficient shading correction cannot be achieved.

The present invention is made in the light of the aforementioned circumstances, and has an object to provide an image processing apparatus which can achieve optimal shading correction even if exposure times differ.

BRIEF SUMMARY OF THE INVENTION

In order to attain the above described object, the present invention provides the following solutions.

One aspect of the present invention provides an image processing apparatus including a γ property storing section that stores a γ property of image pickup device, a shading data storing section that stores a shading pattern acquired by the image pickup device and a first exposure time at a time of acquiring the shading pattern, an image information storing section that stores image data acquired by the image pickup device, and a second exposure time at a time of acquiring the image data, a pre-correction pattern calculating section that calculates a pre-correction pattern which is a shading pattern before γ correction, based on the shading pattern stored in the shading data storing section and the γ property stored in the γ property storing section, a revised pattern calculating section that calculates a revised pattern by performing γ correction for the pre-correction pattern calculated by the pre-correction pattern calculating section after multiplying the pre-correction pattern calculated by the pre-correction pattern calculating section by a ratio of the second exposure time to the first exposure time, and a shading correcting section that performs shading correction for the image data stored in the image information storing section by using the revised pattern calculated by the revised pattern calculating section.

Further, another aspect of the present invention provides an image processing apparatus including a γ property storing section that stores a γ property of image pickup device, a pre-correction pattern calculating section that calculates a pre-correction pattern which is a shading pattern before γ correction, based on a shading pattern acquired by the image pickup device and the γ property stored in the γ property storing section, a shading data storing section that stores the pre-correction pattern calculated by the pre-correction pattern calculating section, and a first exposure time at a time of acquiring the shading pattern, an image information storing section that stores image data acquired by the image pickup device, and a second exposure time at a time of acquiring the image data, a revised pattern calculating section that calculates a revised pattern by performing γ correction for the pre-correction pattern stored in the shading data storing section after multiplying the pre-correction pattern stored in the shading data storing section by a ratio of the second exposure time to the first exposure time, and a shading correcting section that performs shading correction for the image data stored in the image information storing section by using the revised pattern calculated by the revised pattern calculating section.

In the above described aspect, a γ property acquiring section that acquires the γ property of the image pickup device may be included, and the γ property storing section may store the γ property acquired by the γ property acquiring section.

Further, in the above described aspect, a γ property selecting section that allows an operator to select the γ property of the image pickup device may be included, and the γ property storing section may store the γ property selected by the γ property selecting section.

Further, in the above described aspect, a γ property estimating section that estimates the γ property of the image pickup device from a relation of an exposure time and a luminance value based on luminance values of a plurality of images obtained by switching the exposure time of the image pickup device may be included, and the γ property storing section may store the γ property estimated by the γ property estimating section.

DETAILED DESCRIPTION OF THE INVENTION

An image processing apparatus 1 according to one embodiment of the present invention will be described hereinafter with reference to the drawings.

Figure 1:
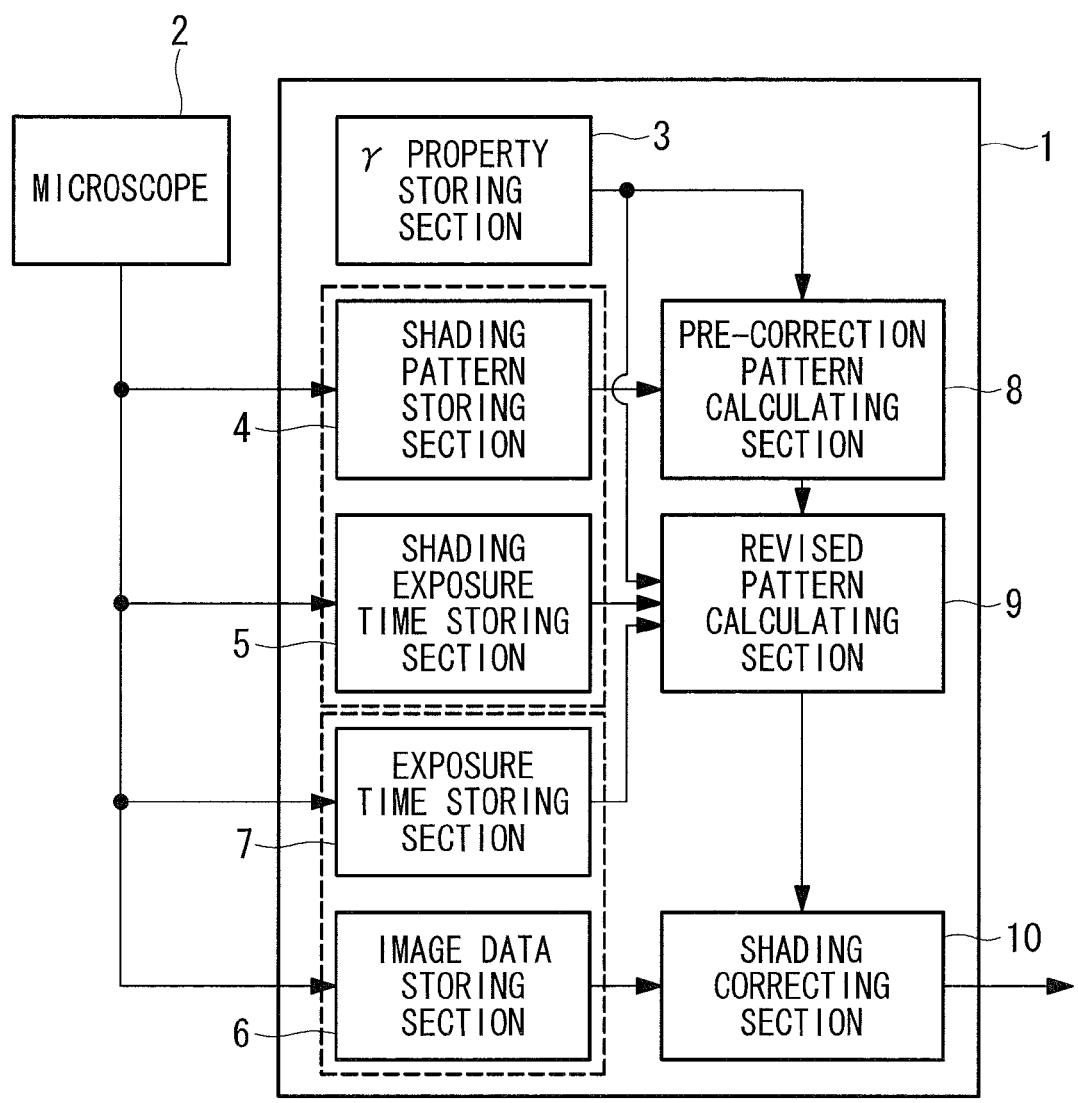
FIG. 1 is a block diagram showing an image processing apparatus according to one embodiment of the present invention.

The image processing apparatus 1 according to the present embodiment, as shown FIG. 1, includes a γ property storing section 3 that stores a γ curve (γ property) of a camera (image pickup device) which is detachably attached to a microscope 2, a shading pattern storing section 4 which stores a shading pattern sent from the camera of the microscope 2, a shading exposure time storing section 5 which stores an exposure time at a time of acquiring the shading pattern, an image data storing section 6 which stores image data, and an exposure time storing section 7 which stores an exposure time at a time of acquiring the image data.

In the present embodiment, a PC (personal computer) is used as the image processing apparatus 1, and a CCD camera is used as the camera of the microscope 2. In the present embodiment, a CCD camera is used as the camera of the microscope 2, but the camera is not limited to a CCD camera, and a CMOS camera, a video camera, a multiplier phototube or the like may be used.

A shading data storing section is configured by the shading pattern storing section 4 and the shading exposure time storing section 5. Further, an image information storing section is configured by the image data storing section 6 and the exposure time storing section 7.

A shading pattern is acquired by the camera of the microscope with only an illuminating light without disposing a specimen on a stage of the microscope 2.

Image data is acquired by disposing a specimen which is an actual observation object on the stage of the microscope 2 and photographing the specimen by the camera of the microscope 2.

Further, the image processing apparatus 1 according to the present embodiment further includes a pre-correction pattern calculating section 8, a revised pattern calculating section 9, and a shading correcting section 10.

The pre-correction pattern calculating section 8 calculates a pre-correction pattern (FIG. 4, reference sign C) which is a shading pattern before γ correction, based on a γ curve (FIG. 4, reference sign B) stored in the γ property storing section 3, and a shading pattern (FIG. 4, reference sign A) stored in the shading pattern storing section 4.

More specifically, when photographing is performed with only the illuminating light without disposing a specimen on the stage of the microscope 2, by the camera of the microscope 2, a shading pattern for which γ correction is automatically performed by the γ curve which the camera has is acquired. Accordingly, the shading pattern which is stored in the shading pattern storing section 4 is a shading pattern for which γ correction is performed.

Figure 4:
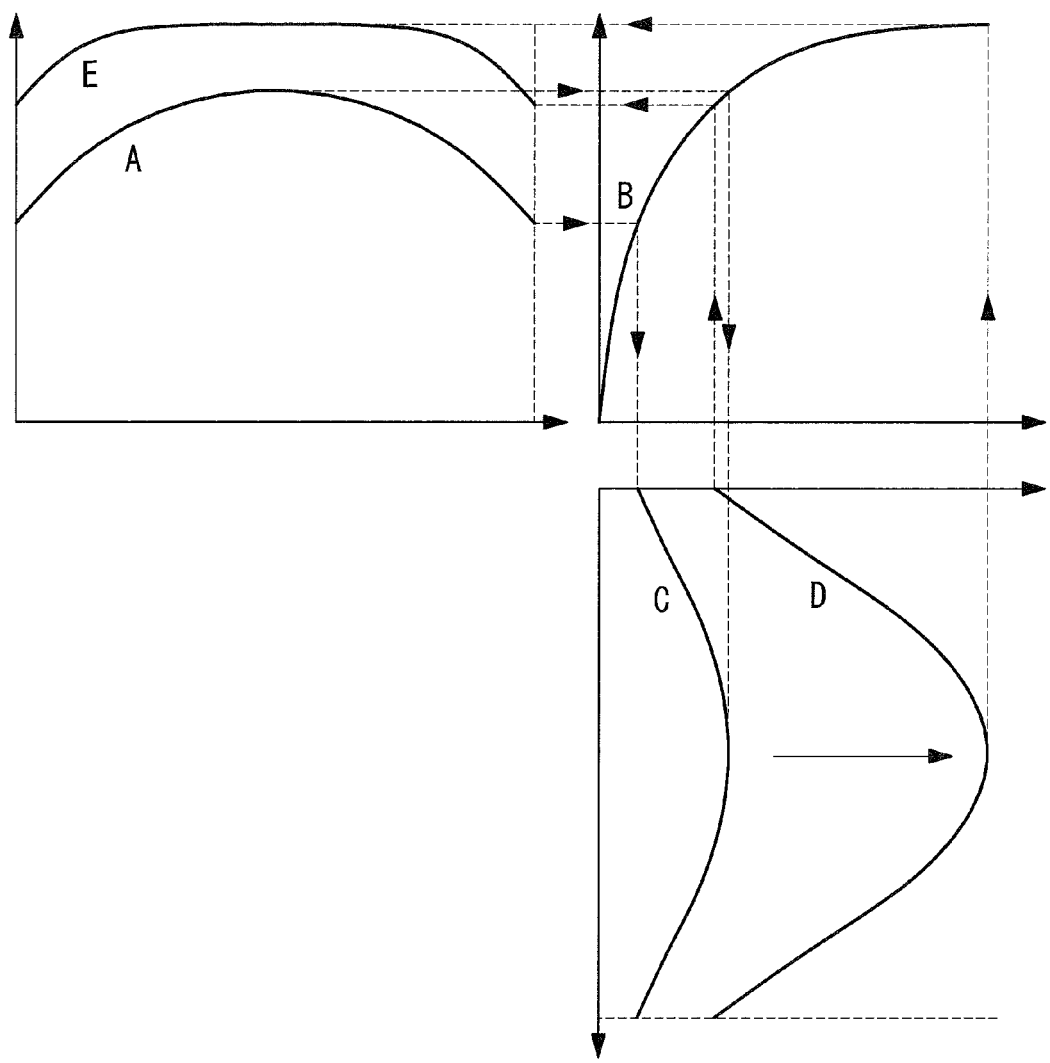
FIG. 4 is a view explaining a revised pattern creating procedure of the image processing apparatus of FIG. 1.

The shading pattern shown in FIG. 4 shows a luminance distribution along a diagonal line of an image which is obtained by photographing with only the illuminating light without disposing a specimen on the stage of the microscope, for example. The luminance distribution is not limited to this, and may be a luminance distribution along any one of the vertical and lateral center lines of the image, or may be a three-dimensional luminance distribution.

In the pre-correction pattern calculating section 8, the γ curve is applied in the opposite direction to the shading pattern for which γ correction is already performed, and the pre-correction pattern that is a shading pattern for which γ correction is not performed is calculated.

Further, the revised pattern calculating section 9 calculates a revised pattern (FIG. 4, reference sign E), based on the pre-correction pattern calculated by the pre-correction pattern calculating section 8, an exposure time (first exposure time t1) at a time of acquiring a shading pattern, which is stored in the shading exposure time storing section 5, an exposure time (second exposure time t2) at a time of acquiring an image data, which is stored in the exposure time storing section 7, and the γ curve of the camera, which is stored in the γ property storing section 3.

More specifically, the revised pattern calculating section 9 multiplies the pre-correction pattern by a ratio t2/t1 of the exposure time t2 to the shading exposure time t1, performs γ correction for the obtained shading pattern (FIG. 4, reference sign D) by applying the γ curve to the obtained shading pattern, and thereby calculates the revised pattern (FIG. 4, reference sign E).

The shading correcting section 10 performs shading correction of the image data stored in the image data storing section 6 by using the revised pattern calculated by the revised pattern calculating section 9.

An operation of the image processing apparatus 1 according to the present embodiment which is configured as above will be described hereinafter.

Figure 2:
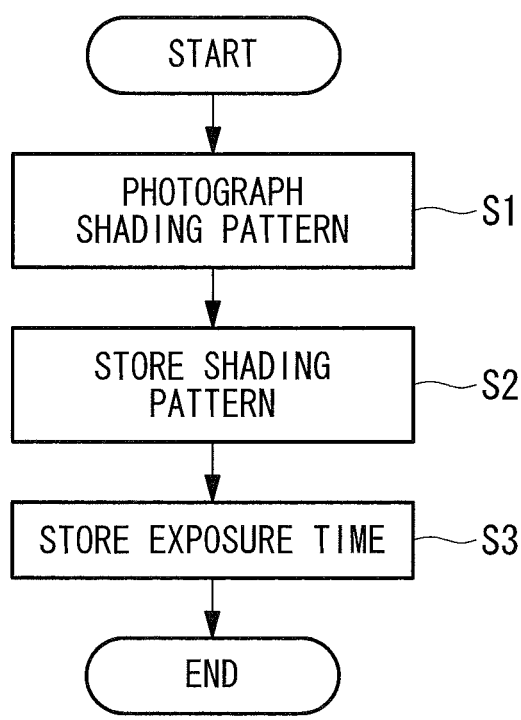
FIG. 2 is a flowchart explaining an acquiring method of a shading pattern by the image processing apparatus of FIG. 1.

In order to process image data by using the image processing apparatus 1 according to the present embodiment, a shading pattern is acquired by photographing with only an illuminating light without disposing a specimen on the stage of the microscope 2 by the camera of the microscope 2 as shown in FIG. 2, prior to the processing (step S1), the acquired shading pattern is stored in the shading pattern storing section 4 (step S2), and the exposure time at the time of photographing the shading pattern is stored in the shading exposure time storing section 5 (step S3). Thereby, preparation before image processing is finished.

Figure 3:
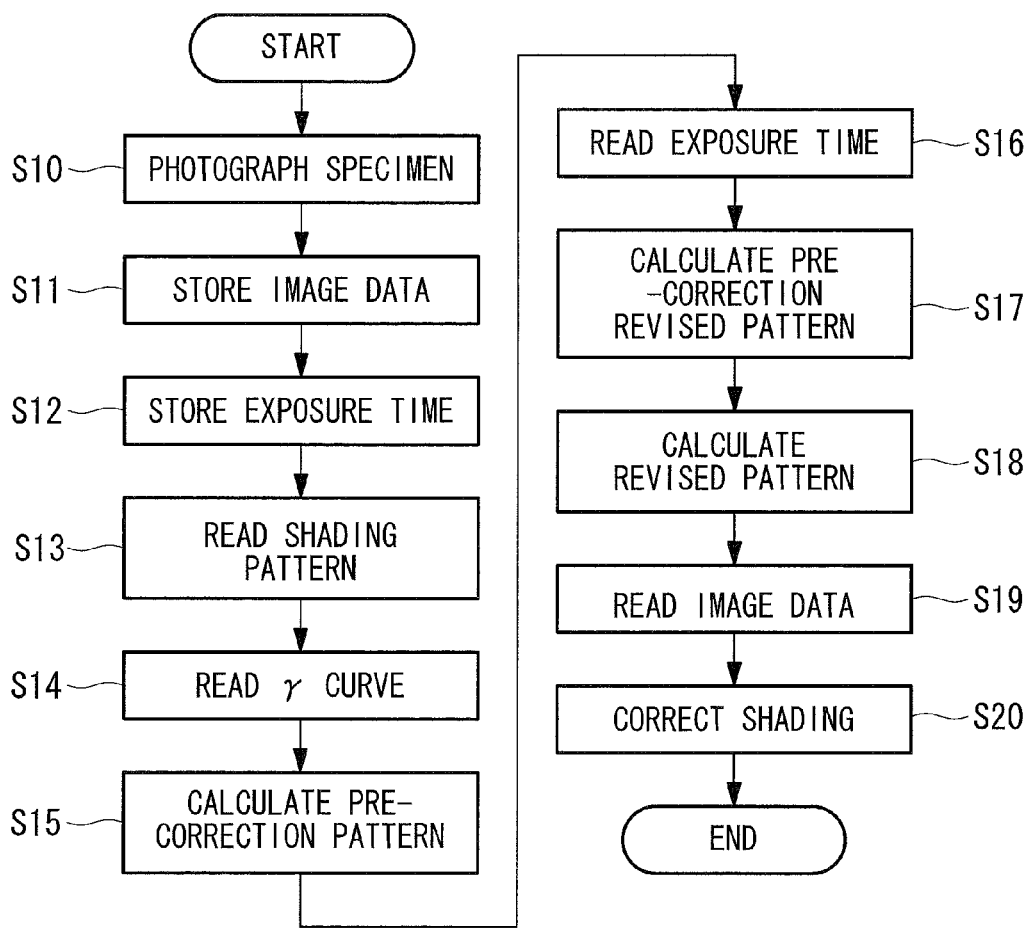
FIG. 3 is a flowchart explaining image processing by the image processing apparatus of FIG. 1.

Next, the specimen which is an observation object is disposed on the stage of the microscope 2, photographing of the specimen is performed (step S10) as shown in FIG. 3, the acquired image data of the specimen is stored in the image data storing section 6 (step S11), and the exposure time in the photographing time is stored in the exposure time storing section 7 (step S12).

In this state, the shading pattern is read from the shading pattern storing section 4 (step S13), and the γ curve is read from the γ property storing section 3 (step S14).

Subsequently, in the pre-correction pattern calculating section 8, the γ curve (reference sign B) which is read from the γ property storing section is applied to the shading pattern (reference sign A) which is read from the shading pattern storing section 4, and the pre-correction pattern (reference sign C) which is a shading pattern before γ correction is calculated as shown in FIG. 4 (step S15).

Next, the two exposure times which are stored in the shading exposure time storing section 5 and the exposure time storing section 7 are read (step S16).

Thereafter, in the revised pattern calculating section 9, the pre-correction pattern is multiplied by the ratio t2/t1 of the second exposure time t2 to the first exposure time t1, whereby the pre-correction revised pattern (reference sign D) is calculated (step S17), and γ correction is performed for the obtained pre-correction revised pattern by applying the γ curve (reference sign B) to the obtained pre-correction revised pattern, whereby the revised pattern (reference sign E) is calculated (step S18).

Subsequently, the image data stored in the image data storing section 6 is read (step S19), and the image data is subjected to shading correction by the shading correcting section 10 by using the revised pattern calculated by the revised pattern calculating section 9 (step S20).

More specifically, in the image processing apparatus 1 according to the present embodiment, when the image data acquired by the camera of the microscope 2 and the second exposure time t2 are stored in the image data storing section 6 and the exposure time storing section 7, the pre-correction pattern is calculated by the pre-correction pattern calculating section 8, based on the shading pattern stored in the shading pattern storing section 4 and the γ property stored in the γ property storing section 3. γ correction is automatically applied to the shading pattern which is acquired by the camera of the microscope 2, and therefore, in the pre-correction pattern calculating section 8, the pre-correction pattern which is not subjected to γ correction is calculated from the shading pattern which is acquired by the camera of the microscope 2.

Subsequently, in the revised pattern calculating section 9, the pre-correction pattern is multiplied by the ratio of the second exposure time to the first exposure time t1, and the revised pattern is calculated. In the shading correcting section 10, shading correction using the revised pattern is performed for the image data which is stored in the image data storing section 6. γ correction is also automatically applied to the image data which is acquired by the camera of the microscope 2, but the revised pattern is used as the shading pattern for performing shading correction therefor, and therefore, even when the first exposure time t1 and the second exposure time t2 differ from each other, optimal shading correction can be achieved.

As above, according to the image processing apparatus 1 according to the present embodiment, the shading pattern is revised in accordance with the exposure time at the time of photographing the specimen which is the observation object, and therefore, the advantage is obtained, that even if the exposure time t2 at the time of photographing significantly differs from the exposure time t1 at the time of acquiring the shading pattern, optimal shading correction can be achieved for the image data. Further, the advantage of no need of preparation of a shading pattern for each exposure time is also obtained.

Figure 5:
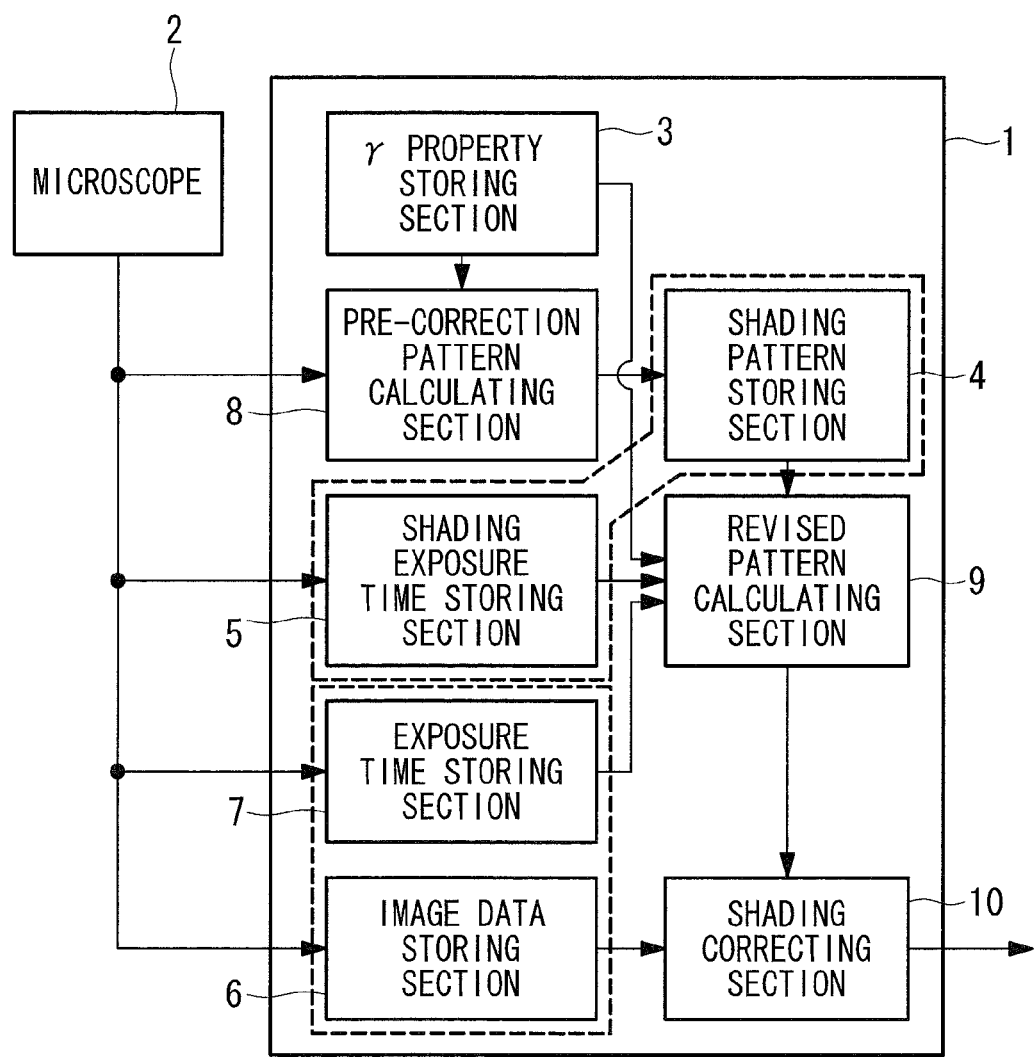
FIG. 5 is a block diagram showing a first modified example of the image processing apparatus of FIG. 1.

In the present embodiment, the shading pattern is stored, and the pre-correction pattern is calculated at each time of correction of the image data, but instead of this, the pre-correction pattern calculated by applying the γ curve to the shading pattern which is inputted from the camera of the microscope 2 may be stored in the shading pattern storing section 4 without storing the shading pattern itself, as shown in FIG. 5.

By doing as above, the pre-correction pattern does not have to be calculated at each time of correction of the image data, and the processing speed can be enhanced.

More specifically, when the image data acquired by the camera of the microscope 2 and the second exposure time t2 are stored in the image data storing section 6 and the exposure time storing section 7, the pre-correction pattern is calculated by the pre-correction pattern calculating section 8 based on the shading pattern acquired by the camera of the microscope 2 and the γ property stored in the γ property storing section 3. γ correction is automatically applied to the shading pattern acquired by the camera of the microscope 2. Therefore, in the pre-correction pattern calculating section 8, the pre-correction pattern which is not subjected to γ correction is calculated from the shading pattern acquired by the camera of the microscope 2, and is stored with the first exposure time t1 in the shading pattern storing section 4 and the shading exposure time storing section 5.

Subsequently, in the revised pattern calculating section 9, the pre-correction pattern is multiplied by the ratio of the second exposure time t2 to the first exposure time t1, and the revised pattern is calculated. In the shading correcting section 10, shading correction using the revised pattern is performed for the image data which is stored in the image data storing section 6. γ correction is also automatically applied to the image data which is acquired by the camera of the microscope 2, but the revised pattern is used as the shading pattern for performing shading correction therefor, and therefore, even when the first exposure time t1 and the second exposure time t2 differ from each other, optimal shading correction can be achieved.

Figure 6:
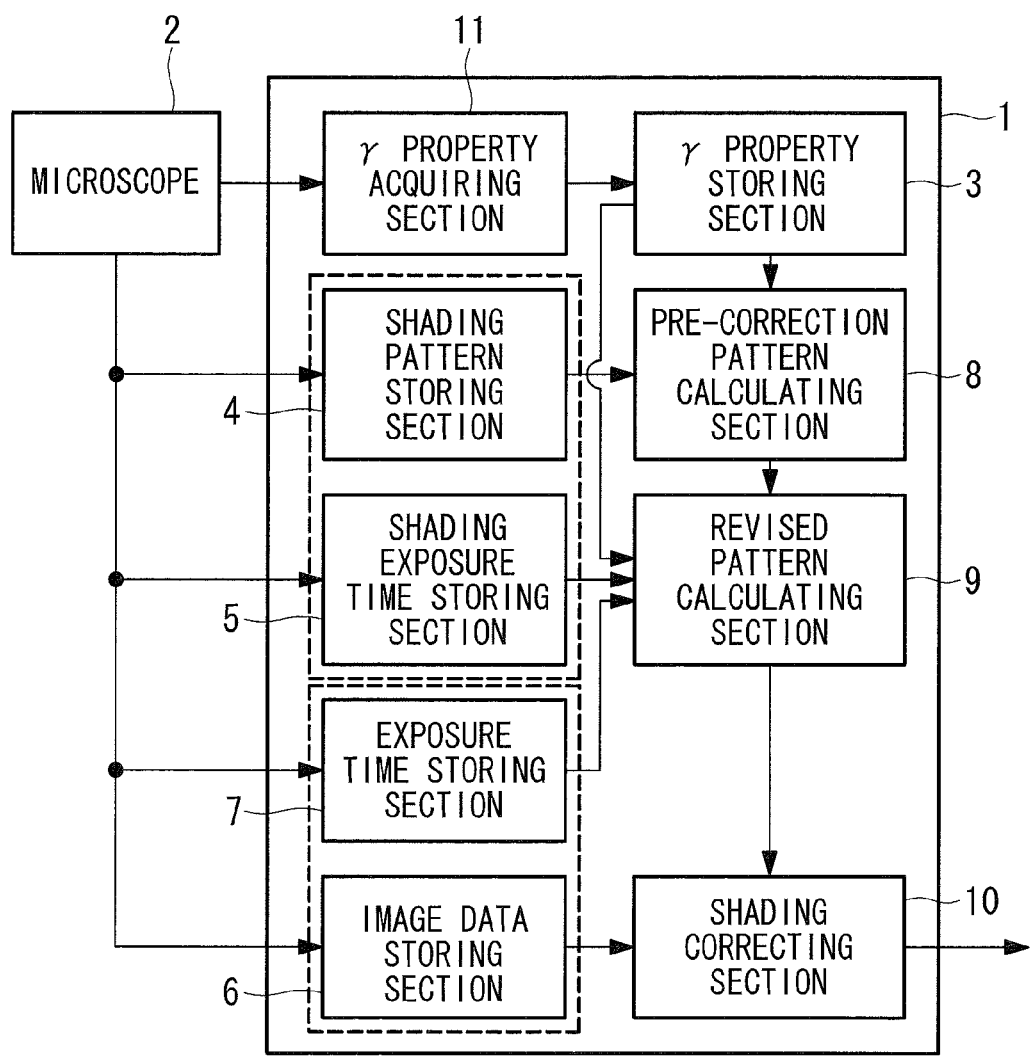
FIG. 6 is a block diagram showing a second modified example of the image processing apparatus of FIG. 1.

Further, in the present embodiment, the γ curve of the camera of the microscope 2 is stored in the γ property storing section 3 in advance, but instead thereof, a γ property acquiring section 11 which acquires the γ curve from the camera is included as shown in FIG. 6, and the γ property storing section 3 may store the γ curve acquired from the camera by the γ property acquiring section 11.

By doing as above, even when the image pickup device having a different γ property is used as the image pickup device such as a camera, the γ property of the image pickup device is acquired by the γ property acquiring section 11, and the revised pattern is calculated by using the acquired γ property. Therefore, even if the image pickup device having various γ properties are used, optimal shading correction can be achieved.

Figure 7:
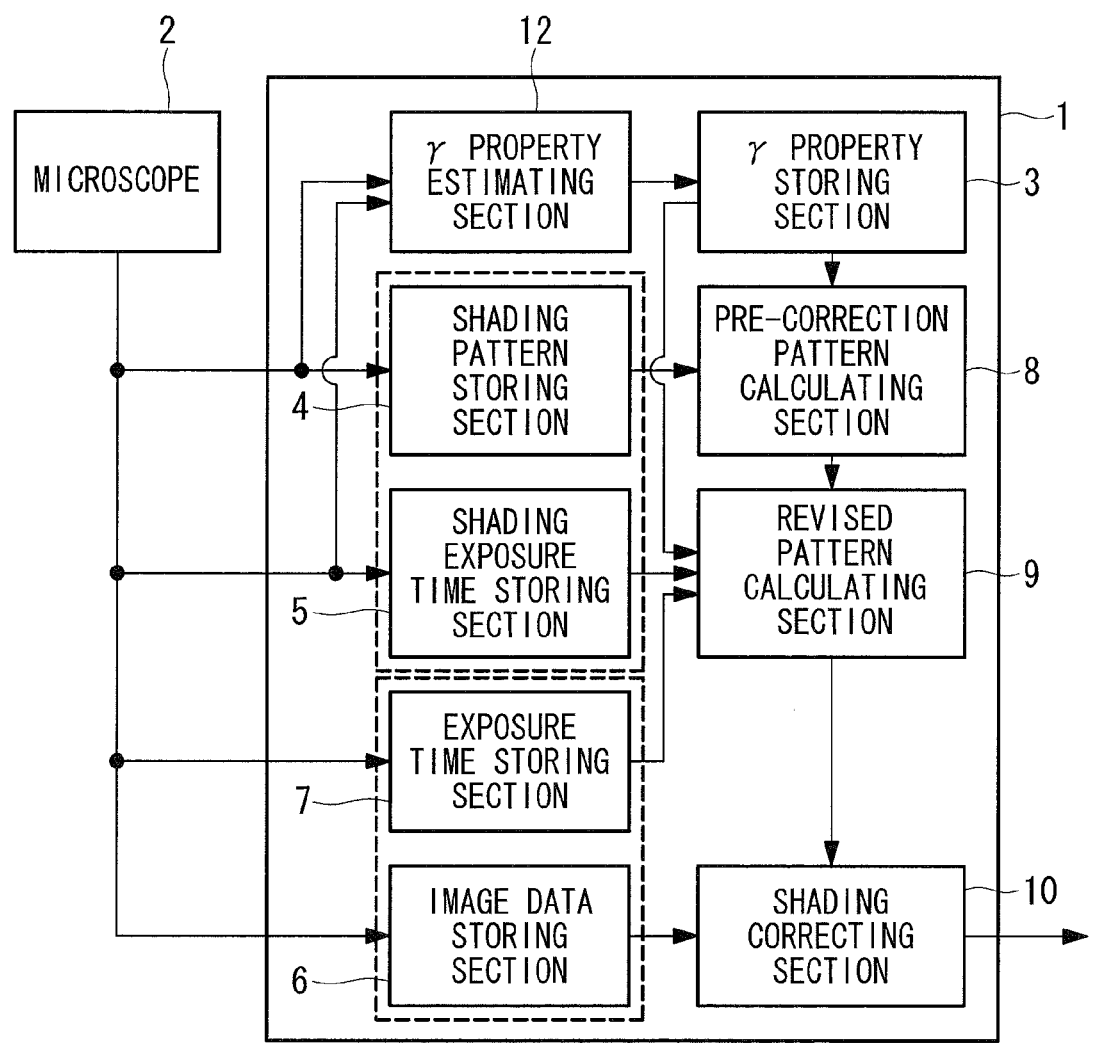
FIG. 7 is a block diagram showing a third modified example of the image processing apparatus of FIG. 1.

Further, as shown in FIG. 7, a γ property estimating section 12 may be included, which estimates a γ curve from the acquired image data and the exposure times after repeating photographing with only an illuminating light without disposing a specimen on the stage of the microscope 2 a plurality of times by the camera of the microscope 2 while switching the exposure time.

By doing as above, the γ property estimating section 12 estimates the γ property from the relation of the luminances of a plurality of images acquired by switching the exposure time by the camera of the microscope 2 and the exposure times, and therefore, even when the γ property of the camera of the microscope 2 is unknown, optimal shading correction can be achieved.

Figure 8:
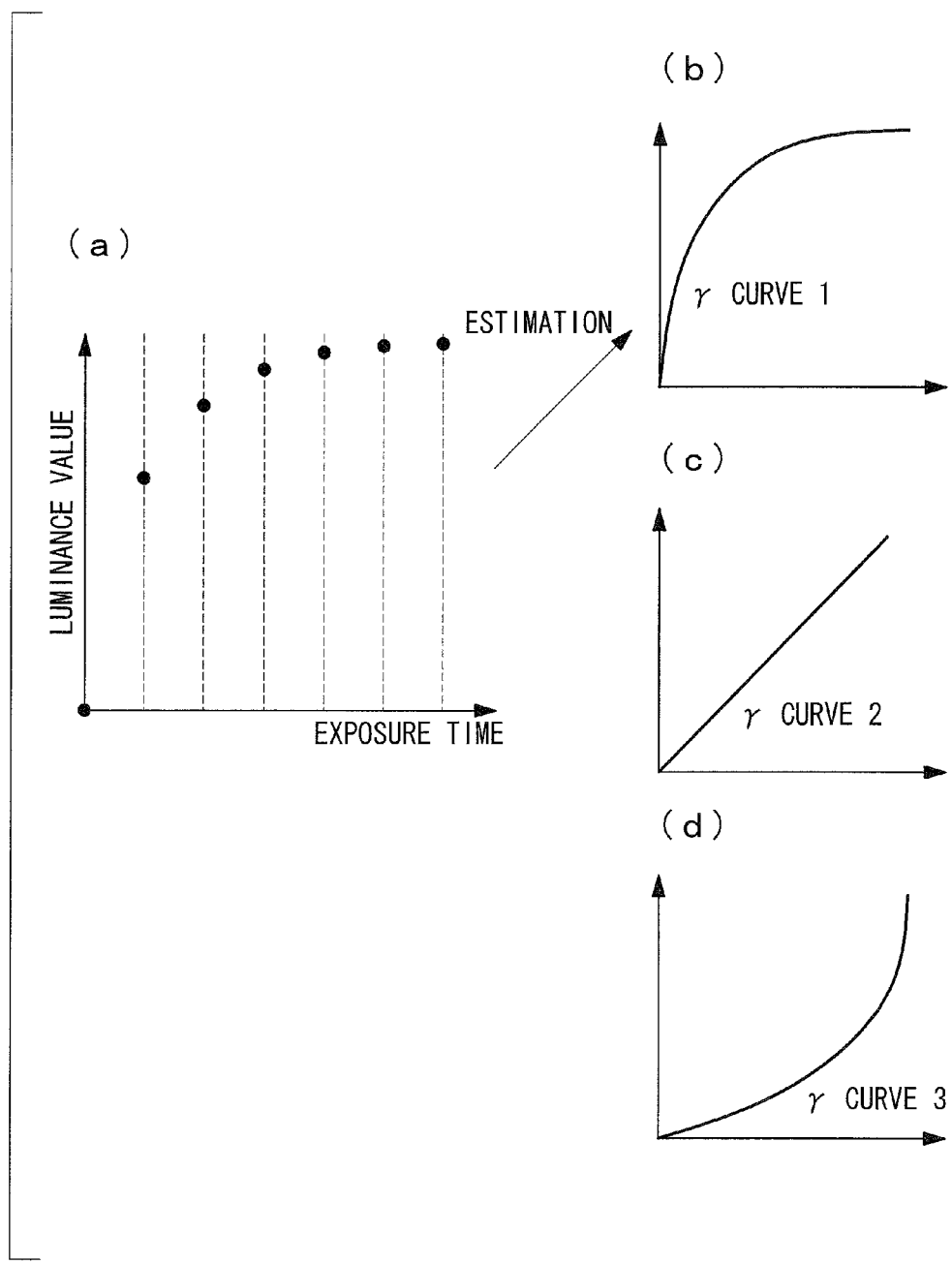
FIG. 8 is a view explaining an estimation method of a γ curve by the image processing apparatus of FIG. 7.

For example, the γ property estimating section 12 stores a plurality of γ curves as shown in FIG. 8(*b*) to (*d*), and estimates a γ curve by selecting the γ curve (γ curve 1 of (b) in FIG. 8) which is the most analogous to the graph showing the relation of the exposure time and the luminance value of the median pixel of the image created by switching the exposure time as shown in FIG. 8(*a*).

By dosing as above, even when the γ curve of the camera is not clear, optimal shading correction can be achieved.

Figure 9:
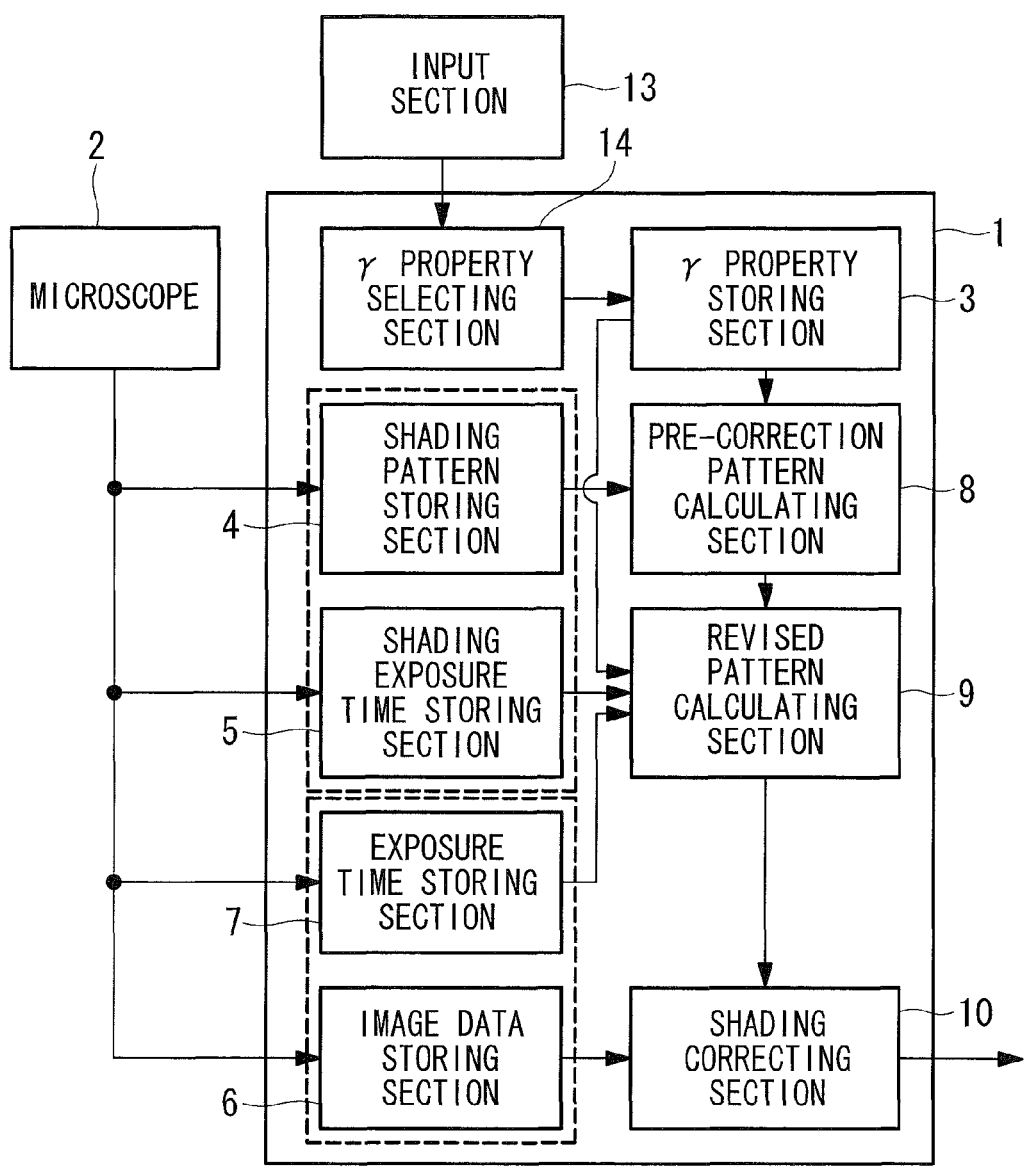
FIG. 9 is a block diagram showing a fourth modified example of the image processing apparatus of FIG. 1.

Further, as shown in FIG. 9, an input section which allows an operator to perform input, and a γ property selecting section 14 which selects a γ curve based on the input to the input section 13 may be included. The γ property selecting section 14 stores, for example, a plurality of γ curves and the identification information thereof by associating the plurality of γ curves with the identification information thereof, and the operator can select the γ curve by inputting the identification information from the input section 13.

By doing as above, the γ property of the camera of the microscope 2 is selected by the operator by using the γ property selecting section 14, and therefore, even if the image pickup device such as a camera of the microscope 2 having various γ properties are used, the operator selects the γ property suited to the image pickup device, and can achieve optimal shading correction. As the selection method of the γ property, the operator may input a γ property itself, or while a plurality of γ properties are stored, the operator may specify a suitable γ property from the stored γ properties.

In the present embodiment, as the input section 13, a keyboard, a mouse, a joystick, and the like are used. The input section 13 may be used for instruction of shading pattern acquisition to acquire a shading pattern by photographing a standard sample by the camera of the microscope 2, and instruction of implementation of shading correction to read the shading pattern from the shading pattern storing section 4.

In the present embodiment, the shading pattern is acquired by the camera of the microscope with only an illuminating light without disposing a specimen on the stage of the microscope 2, but acquisition is not limited to this, and the shading pattern may be acquired by disposing, for example, a uniform white-color standard sample on the stage of the microscope 2, and photographing the sample by the camera of the microscope.

REFERENCE SIGNS LIST

1 IMAGE PROCESSING APPARATUS
3 γ PROPERTY STORING SECTION
4 SHADING PATTERN STORING SECTION (SHADING DATA STORING SECTION)
5 SHADING EXPOSURE TIME STORING SECTION (SHADING DATA STORING SECTION)
6 IMAGE DATA STORING SECTION (IMAGE INFORMATION STORING SECTION)
7 EXPOSURE TIME STORING SECTION (IMAGE INFORMATION STORING SECTION)
8 PRE-CORRECTION PATTERN CALCULATING SECTION
9 REVISED PATTERN CALCULATING SECTION
10 SHADING CORRECTING SECTION
11 γ PROPERTY ACQUIRING SECTION
12 γ PROPERTY ESTIMATING SECTION
14 γ PROPERTY SELECTING SECTION

What is claimed is:

1. An image processing apparatus, comprising:
    a γ property storing section that stores a γ property of image pickup device;
    a shading data storing section that stores a shading pattern acquired by the image pickup device, and a first exposure time at a time of acquiring the shading pattern;
    an image information storing section that stores image data acquired by the image pickup device, and a second exposure time at a time of acquiring the image data;
    a pre-correction pattern calculating section that calculates a pre-correction pattern which is a shading pattern before γ correction, based on the shading pattern stored in the shading data storing section and the γ property stored in the γ property storing section;
    a revised pattern calculating section that calculates a revised pattern by performing γ correction for the pre-correction pattern calculated by the pre-correction pattern calculating section after multiplying the pre-correction pattern calculated by the pre-correction pattern calculating section by a ratio of the second exposure time to the first exposure time; and
    a shading correcting section that performs shading correction for the image data stored in the image information storing section by using the revised pattern calculated by the revised pattern calculating section.

2. The image processing apparatus according to claim 1, further comprising:
    a γ property acquiring section that acquires the γ property of the image pickup device,
    wherein the γ property storing section stores the γ property acquired by the γ property acquiring section.

3. The image processing apparatus according to claim 1, further comprising:
    a γ property selecting section that allows an operator to select the γ property of the image pickup device,
    wherein the γ property storing section stores the γ property selected by the γ property selecting section.

4. The image processing apparatus according to claim 1, further comprising:
    a γ property estimating section that estimates the γ property of the image pickup device from a relation of an exposure time and a luminance value based on luminance values of a plurality of images obtained by switching the exposure time of the image pickup device,
    wherein the γ property storing section stores the γ property estimated by the γ property estimating section.

5. An image processing apparatus, comprising:
    a γ property storing section that stores a γ property of image pickup device;
    a pre-correction pattern calculating section that calculates a pre-correction pattern which is a shading pattern before γ correction, based on a shading pattern acquired by the image pickup device and the γ property stored in the γ property storing section;
    a shading data storing section that stores the pre-correction pattern calculated by the pre-correction pattern calculating section, and a first exposure time at a time of acquiring the shading pattern;
    an image information storing section that stores image data acquired by the image pickup device, and a second exposure time at a time of acquiring the image data;
    a revised pattern calculating section that calculates a revised pattern by performing γ correction for the pre-correction pattern stored in the shading data storing section after multiplying the pre-correction pattern stored in the shading data storing section by a ratio of the second exposure time to the first exposure time; and
    a shading correcting section that performs shading correction for the image data stored in the image information storing section by using the revised pattern calculated by the revised pattern calculating section.

6. The image processing apparatus according to claim 5, further comprising:
    a γ property acquiring section that acquires the γ property of the image pickup device,
    wherein the γ property storing section stores the γ property acquired by the γ property acquiring section.

7. The image processing apparatus according to claim 5, further comprising:
    a γ property selecting section that allows an operator to select the γ property of the image pickup device,
    wherein the γ property storing section stores the γ property selected by the γ property selecting section.

8. The image processing apparatus according to claim 5, further comprising:
    a γ property estimating section that estimates the γ property of the image pickup device from a relation of an exposure time and a luminance value based on luminance values of a plurality of images obtained by switching the exposure time of the image pickup device,
    wherein the γ property storing section stores the γ property estimated by the γ property estimating section.

* * * * *